United States Patent
Lush

(10) Patent No.: US 6,866,004 B1
(45) Date of Patent: *Mar. 15, 2005

(54) COLLAPSIBLE FEEDER

(76) Inventor: Raymon W. Lush, 410 Main St., Bloomfield, NE (US) 68718

( * ) Notice: Subject to any disclaimer, the term of this patent is extended or adjusted under 35 U.S.C. 154(b) by 0 days.

This patent is subject to a terminal disclaimer.

(21) Appl. No.: 10/614,947

(22) Filed: Jul. 8, 2003

(51) Int. Cl.$^7$ .............................................. A01K 5/00
(52) U.S. Cl. .................... 119/52.1; 119/52.2
(58) Field of Search ............... 119/52.1, 52.3, 119/52.2, 429, 431, 61.31, 459, 460, 119/ 461, 498, 499

(56) References Cited

U.S. PATENT DOCUMENTS

| | | | | |
|---|---|---|---|---|
| 1,790,045 | A | * | 1/1931 | Dow .......................... 119/52.1 |
| 2,216,511 | A | * | 10/1940 | Copeman .................... 119/52.3 |
| 2,789,534 | A | * | 4/1957 | Landgraf .................... 119/52.1 |
| 3,961,444 | A | * | 6/1976 | Skaife ............................ 47/79 |
| 4,026,244 | A | | 5/1977 | Salick ....................... 119/51 R |
| 4,204,500 | A | * | 5/1980 | Podjan ....................... 119/57.8 |
| 4,706,851 | A | | 11/1987 | Hegedus et al. ............. 222/106 |
| 4,838,205 | A | * | 6/1989 | Larson ........................ 119/52.2 |
| 5,203,281 | A | | 4/1993 | Harwich ..................... 119/57.9 |
| 5,361,723 | A | * | 11/1994 | Burleigh ..................... 119/52.3 |
| 5,479,881 | A | | 1/1996 | Lush et al. ................. 119/57.8 |
| 5,975,015 | A | * | 11/1999 | Runyon et al. ............. 119/52.1 |
| 6,047,661 | A | | 4/2000 | Lush ......................... 119/51.01 |
| 6,073,582 | A | | 6/2000 | Lush ......................... 119/51.01 |
| 6,427,629 | B1 | | 8/2002 | Lush ........................... 119/52.1 |

* cited by examiner

Primary Examiner—Yvonne R. Abbott
(74) Attorney, Agent, or Firm—Thomte, Mazour & Niebergall; Dennis L. Thomte

(57) ABSTRACT

A collapsible feeder for birds, squirrels and the like and comprises a feeder body including a base and a rim. A series of hollow body segments of graduated diameters extend upwardly from the base within the rim to form a feeder body. The segment of smallest diameter is joined to the base and has a plurality of feed outlet openings formed therein to enable feed from within the feeder body to pass outwardly therefrom onto the base inwardly of the rim. A feeder lid is removably positioned on the upper end of the segment of greatest diameter when the feeder body is in the extended position. The body segments include means for yieldably maintaining the feeder in its straight extended position for filling and hanging.

1 Claim, 5 Drawing Sheets

COLLAPSIBLE FEEDER

BACKGROUND OF THE INVENTION

1. Field of the Invention

This invention relates to a collapsible feeder and more particularly to a collapsible feeder for birds, squirrels and the like which is convenient to fill, convenient to install, convenient for wild game to perch upon, and which is resistant to damage from squirrels and other feeding wildlife. Even more particularly, the collapsible feeder of this invention includes means for yieldably maintaining the feeder in its extended position while the feeder is being filled and/or hung.

2. Description of the Related Art

Selectively collapsible containers are commonly used to hold seeds, suet and the like as food for wild animals such as birds, squirrels, etc. Many of the collapsible wild game feeders of the prior art are constructed from plastic polymer, natural fiber mesh or netting. Mesh or netting feeders have the advantage of not requiring a rod, dowel or other support for small birds, since the birds can perch on the mesh or net and feed at any exposed location on the feeder. Examples of mesh or net feeders of the prior art including the Thistle Pouch brand feeder manufactured by Havegard Farm, Inc. of Algoma, Wis., and Feather Friends E-Z Feeders brand wild bird feeder marketed by Canine's Choice of Marion, Ind. Other types of collapsible feeders are disclosed in U.S. Pat. Nos. 5,203,281; 4,706,851 and 4,026,244. Another type of collapsible wild game feeder is described in applicant's U.S. Pat. No. 5,479,881. The feeder of the '881 patent consists of a solid, weather-resistant bag fitted with openings at its base to allow attachment of rods for perching and access to the seed or other food contained in the bag.

Although many collapsible wild game feeders of the known art are convenient to install and highly attractive to wild game when they are first placed in use, none of the collapsible feeders of the known art are suitable for the feeding of squirrels or other large, aggressive feeding wildlife such as jays and monk parakeets. Squirrels and other large, aggressive feeding wildlife quickly tear the mesh of collapsible feeders of the known art and create holes through which the food spills from the feeder onto the ground below. Similarly, squirrels and large birds can easily enlarge the feeding openings or simply create new openings in the walls of the feeder of the '881 patent. After squirrels or large birds have damaged the net, webbing or walls of feeders of the known art, the food spills out and is no longer available to attract wildlife to the feeder. Further, the spilled feed creates additional problems by attracting mice and other pests that feed on the ground.

Wire mesh feeders constructed of rigid steel wire are also well known to those skilled in the art of wild game feeding. The rigid steel wire mesh feeders are frequently used to hold blocks of suet or mixtures of seed, animal fat, peanut butter and the like. Although the rigid wire mesh feeders of the known art are resistant to chewing by squirrels and pecking by aggressive feeding birds, the rigid wire mesh feeders are not selectively collapsible for storage, shipment, etc. When the rigid wire mesh feeders are bent, dented, flattened or crushed, they cannot be expanded and reused without suffering metal fatigue and damage to their attachments, connections and welds. One further disadvantage of many collapsible feeders is that they are suited for only one size of feed.

In an effort to overcome the disadvantages of the prior art collapsible feeders, applicant previously designed collapsible feeders which are disclosed in U.S. Pat. Nos. 6,047,661 and 6,073,582. In the '661 and '582 patents, the mesh openings were designed to accommodate a specific seed size. Applicant provided an improved collapsible feeder which is disclosed in U.S. Pat. No. 6,427,629 which issued on Aug. 6, 2002. Although applicant's feeder of U.S. Pat. No. 6,427,629 truly represented an improvement over the prior art, the feeder sometimes would not remain in its extended position while the feeder was being filled or hung which sometimes resulted in feed flowing from the feeder from between adjacent rings. The feeders of applicant's earlier patents truly represented a significant advance in the art and it is believed that the collapsible feeder described herein represents an improvement over applicant's earlier designs.

SUMMARY OF THE INVENTION

A collapsible feeder for birds, squirrels and the like is disclosed and includes a collapsible feeder body, having upper and lower ends, comprising a base and a rim, a series of hollow body members of graduated diameters which are extendible to form a feeder body, the segment of smallest diameter being joined to the base, the other segments being collapsible around the segment of smallest diameter inwardly of the rim. A feeder lid is removably positioned on the upper end of the segment of greatest diameter when the feeder body is in the extended position. A hanger is pivotally secured to the roof of the uppermost segment for supporting the feeder on a branch, hanger, etc. The segment of smallest diameter has feed outlets formed therein so that feed in the feeder body may pass outwardly through the feed outlets onto the base inwardly of the rim. The feeder body may be annular, square, rectangular or any other suitable configuration. The feeder may be comprised of metal, plastic, glass or a combination of the same. The feeder can accommodate any kind of bird feed or even a mix of different seeds. The feeder includes means for yieldably maintaining the feeder in its extended position to facilitate the filling and hanging of the feeder.

It is therefore a principal object of the invention to provide a selectively collapsible feeder for birds, squirrels and other wild game.

Yet another object of the invention is to provide a selectively collapsible feeder which is constructed of a metal, glass or plastic material or combinations thereof.

Still another object of the invention is to provide a selectively collapsible feeder which occupies a minimum of space for shipping and storage when empty.

Still another object of the invention is to provide a selectively collapsible feeder which is suitable for the feeding of both small perching birds in addition to squirrels, jays and other more aggressive feeding wildlife species.

Yet another object of the invention is to provide a selectively collapsible feeder which includes means for yieldably maintaining the feeder in a straight extended position.

These and other objects will be obvious to those skilled in the art.

DESCRIPTION OF THE PREFERRED EMBODIMENT

Figure 1:
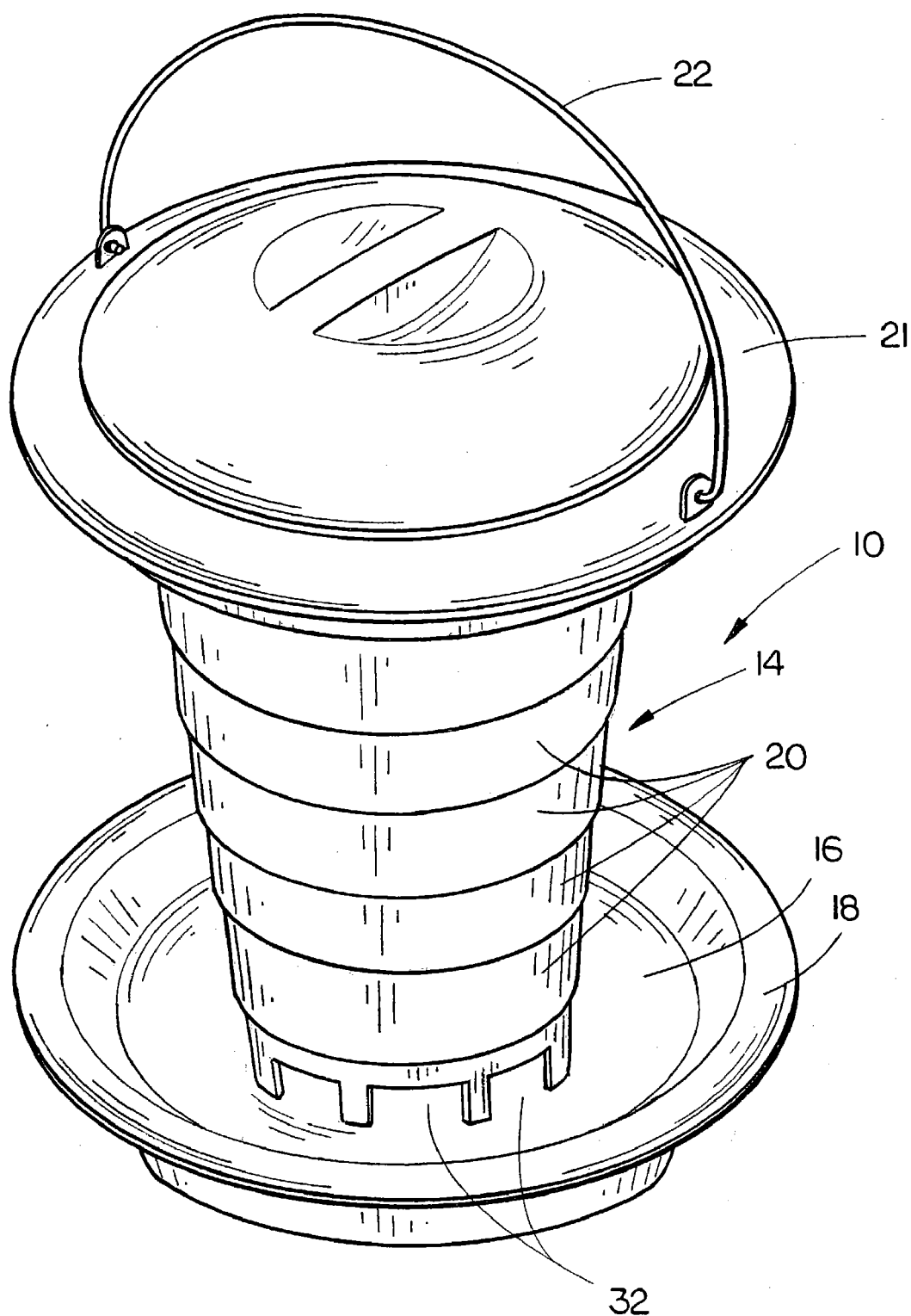
FIG. 1 is a perspective view of the feeder of this invention in an extended position.
Figure 3:
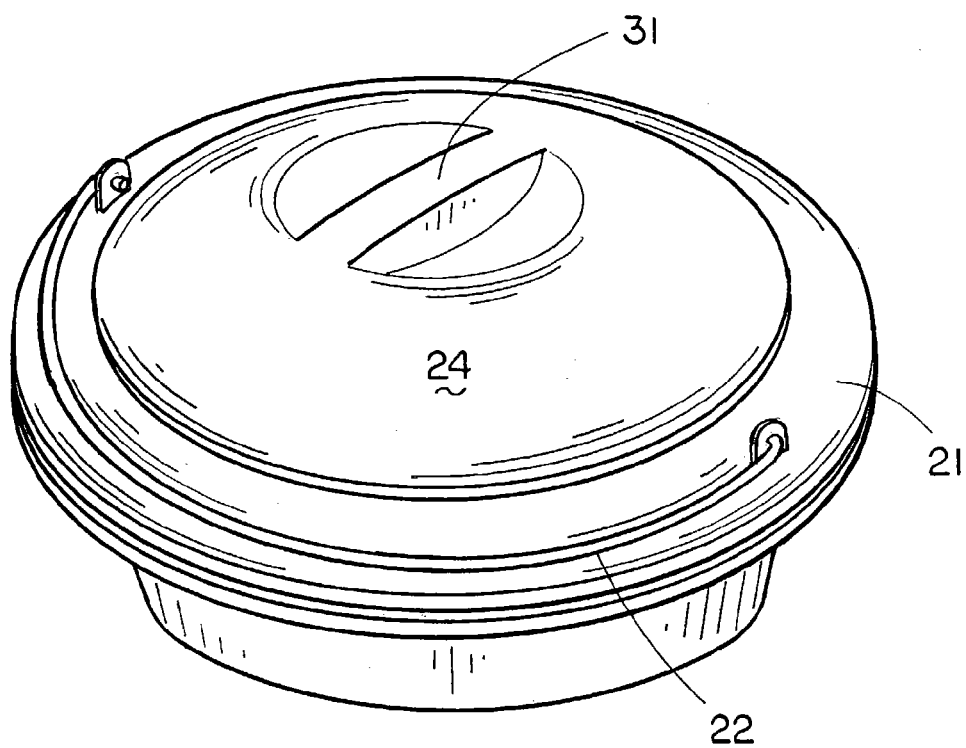
FIG. 3 is a perspective view of the feeder in a collapsed condition.
Figure 4:
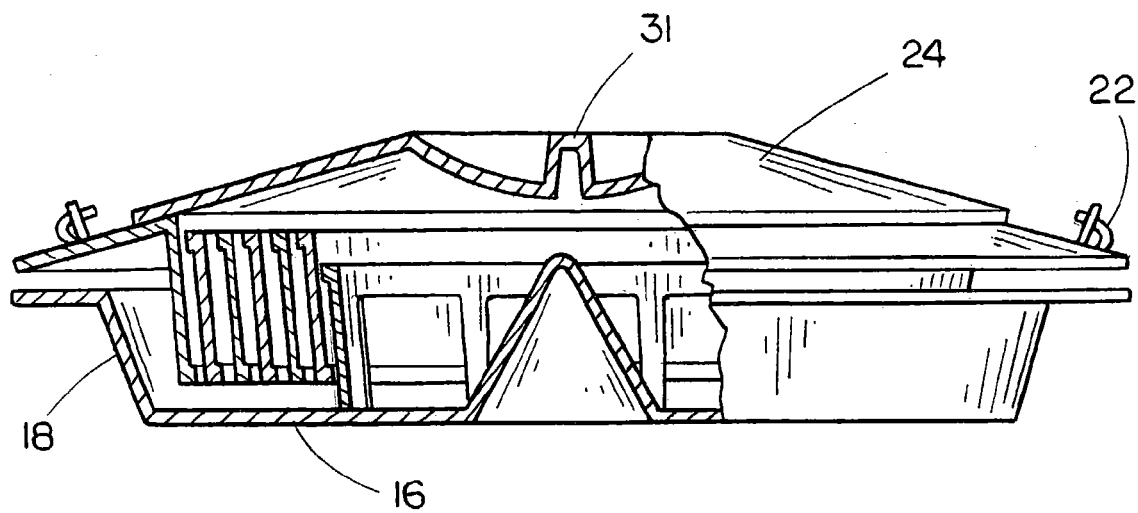
FIG. 4 is a side view of the feeder of FIG. 2 in a collapsed position with portions thereof cut away to more fully illustrate the invention.

The collapsible feeder of this invention is referred to generally by the reference numeral 10. Feeder 10 includes a feeder body 14 which has upper and lower ends. Feeder body 14 comprises a base 16, rim 18, and a series of hollow body segments 20 of graduated diameters which are extendible to form a feeder body. The segment of smallest diameter (the lowest segment 20) is joined to the base 16. The other segments 20 are collapsible around the lowermost segment of smallest diameter inwardly of the rim 18, as illustrated in FIG. 4. The uppermost segment 20 includes a roof section 21 which extends downwardly and outwardly from the upper end thereof. A hanger 22 is pivotally connected to the roof 21 of the segment of greatest diameter (the uppermost segment 20) for supporting the feeder from a suitable support, branch, etc. Roof 21 defines a central opening 23. The numeral 24 refers to a cone-shaped lid which selectively closes opening 23. Lid 24 includes a recessed handle 31, as seen in FIGS. 3 and 4. A plurality of feed outlet openings 32 are formed in the segment 20 of smallest diameter (the lowermost segment 20) to enable food within the feeder body to pass outwardly therethrough inwardly of the rim 18, as seen in FIG. 1.

Two different embodiments of the feeder are disclosed with those two embodiments each including structure or means to maintain the feeder in its extended, upright and straight position to facilitate the filling of the feeder and to facilitate the hanging of the feeder from an appropriate support.

Figure 2:
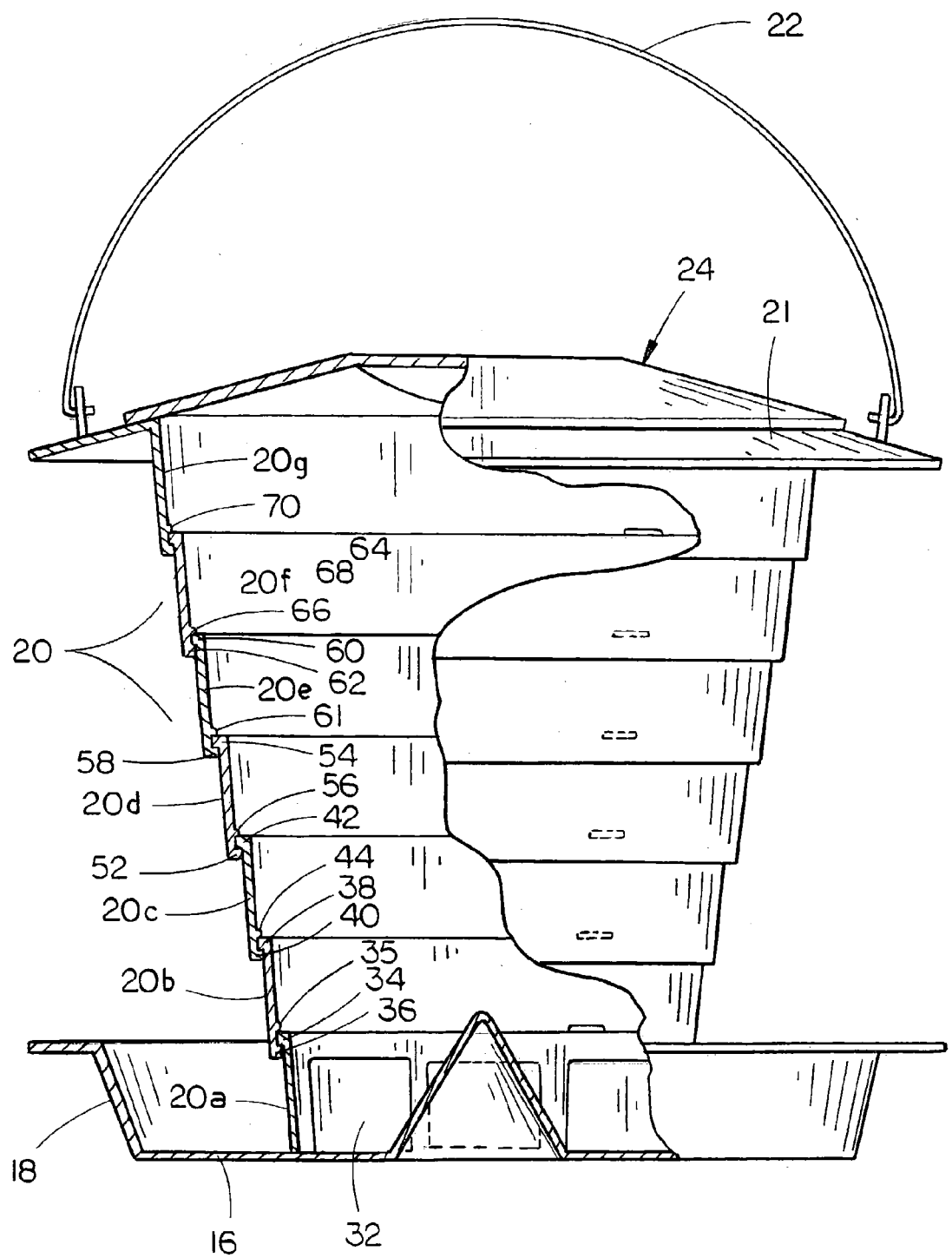
FIG. 2 is a side view of one embodiment of the invention in an extended position with portions thereof cut away to more fully illustrate the invention.

In FIG. 2, the lowermost segment or ring 20a has a shoulder 34 which extends outwardly therefrom. The next segment or ring 20b has a lower shoulder 36 which extends inwardly therefrom, as seen in FIG. 2. The interior surface of segment or ring 20a has a plurality of spaced-apart raised lips or protrusions 35 extending inwardly therefrom which are positioned immediately above shoulder 34 when shoulders 34 and 36 are in abutting engagement, as seen in FIG. 2. Upper shoulder 38 extends outwardly from the upper end of segment or ring 20b. Likewise, segment or ring 20c has lower and upper shoulders 40 and 42, respectively, and a plurality of spaced-apart raised lips or protrusions 44. Similarly, segment or ring 20d has lower and upper shoulders 52 and 54, respectively, and a plurality of spaced-apart raised lips or protrusions 56. Segment 20e has lower and upper shoulder 58 and 60, respectively, and a raised lip or protrusion 61. Segment 20f includes lower and upper shoulders 62 and 64, respectively, and a plurality of spaced-apart raised lips or protrusions 66. The uppermost segment 20g includes lower shoulder 68 and a plurality of spaced-apart raised lips or protrusions 70. Although the protrusions or lips are described as being spaced-apart, they could be continuous or ring-like if so desired. As seen in FIG. 2, the roof 21 extends downwardly and outwardly from the upper end of segment 20g. Roof 21 is provided with a plurality of spaced-apart openings or slots which have an enlarged portion 74 and a narrow portion 76. Lid 24 is provided with a plurality of spaced-apart locking lugs 78 which extend downwardly from the periphery thereof. Lid 24 is selectively maintained on roof 21 by inserting the lugs 78 downwardly through the enlarged portions 74 of slots 74 and then rotating the lid 24 in a counterclockwise direction so that lugs 78 are positioned beneath the narrow portions 76 of slots 72. Since the lugs 78 have a dimension which is greater than the dimension of narrow portion 76, the lid 24 cannot be raised with respect to the roof 21, thereby maintaining the lid 24 on roof 21.

Figure 5B:
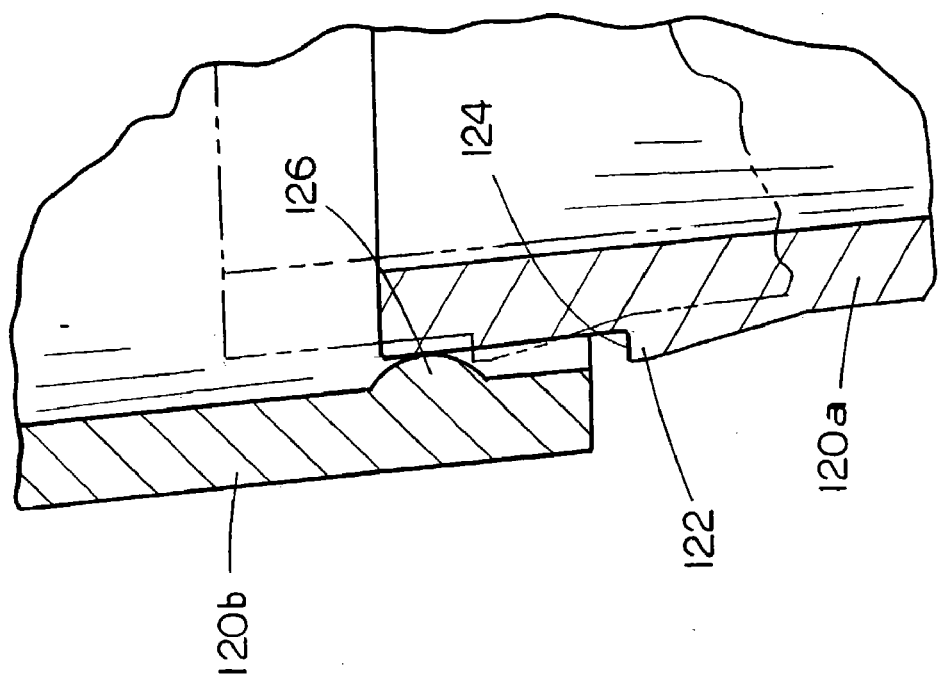
FIG. 5B is a sectional view illustrating a modified means for selectively maintaining the feeder in its extended position.

In the embodiment of FIG. 5B, the lowermost segment or ring 120a has its lower end secured to the pan or tray of the feeder and has a plurality of outwardly extending, spaced-apart raised areas or protrusions 122 formed thereon, each of which defines a shelf 124 at the upper end thereof. Raised areas 122 may be continuous or annular rather than being spaced-apart.

Segment or ring 120b has outwardly extending annular raised lip or protrusion 126. Similarly, the segments or rings above segment 120b have outwardly extending raised areas or protrusions provided thereon, respectively, as well as the spaced-apart raised lips.

The collapsible feeder of this invention will normally be in the collapsed position during shipment or storage with the configuration thereof occupying very little space in the collapsed position. When it is desired to move the feeder to its extended position for feeding purposes, the hanger 22 is moved upwardly with respect to the base 16 to cause the segments 20 to move to the straight extended position to form the feeder body. The close engagement of the segments 20 with one another prevents feed from passing downwardly therebetween. When feed is placed in the interior of the feeder body, a certain amount of the feed passes outwardly through the openings 32 onto the base 16 inwardly of the rim 18. The wild animals may perch on the rim 18 to feed.

Figure 5A:
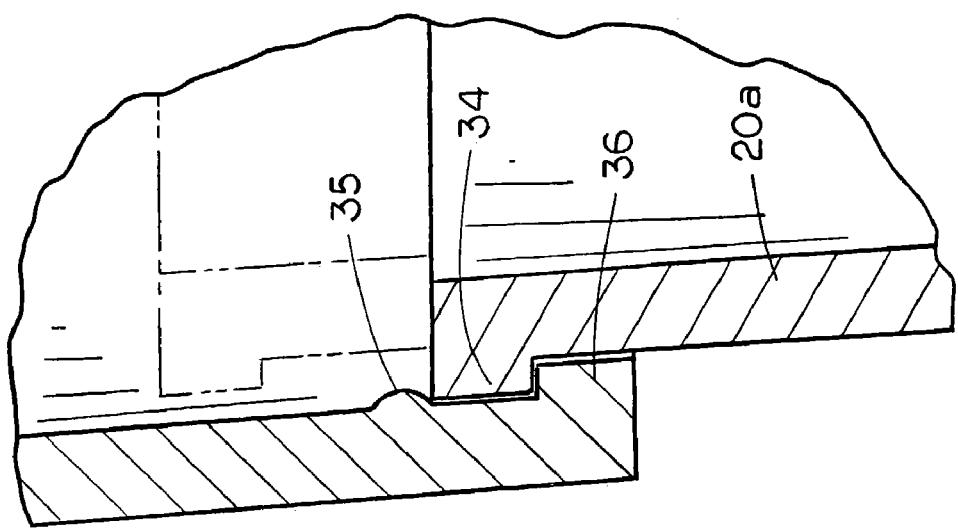
FIG. 5A is a sectional view of the structure utilized in the embodiment of FIG. 2 to selectively maintain the feeder in its extended position.
Figure 7:
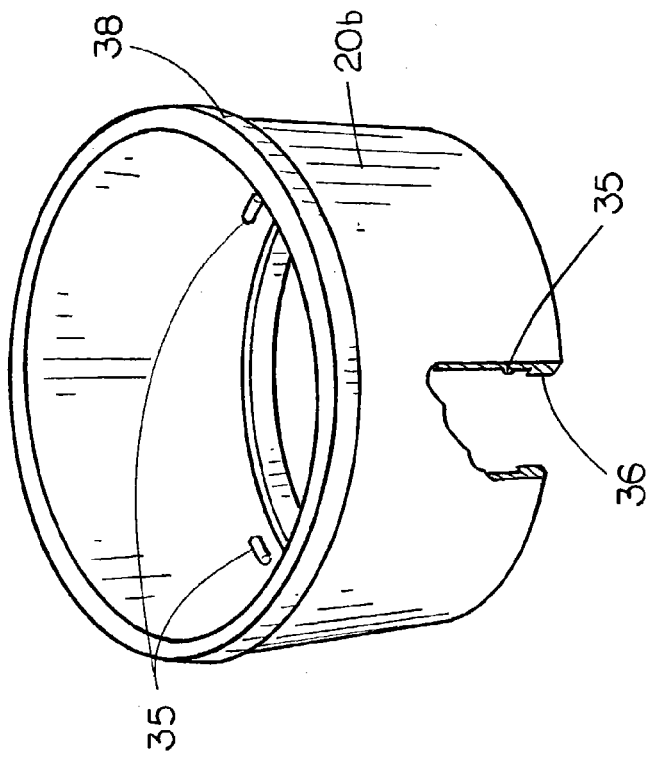
FIG. 7 is a perspective view of one of the rings or segments of the embodiment of FIG. 2 with a portion thereof cut away to more fully illustrate the invention.
Figure 6:
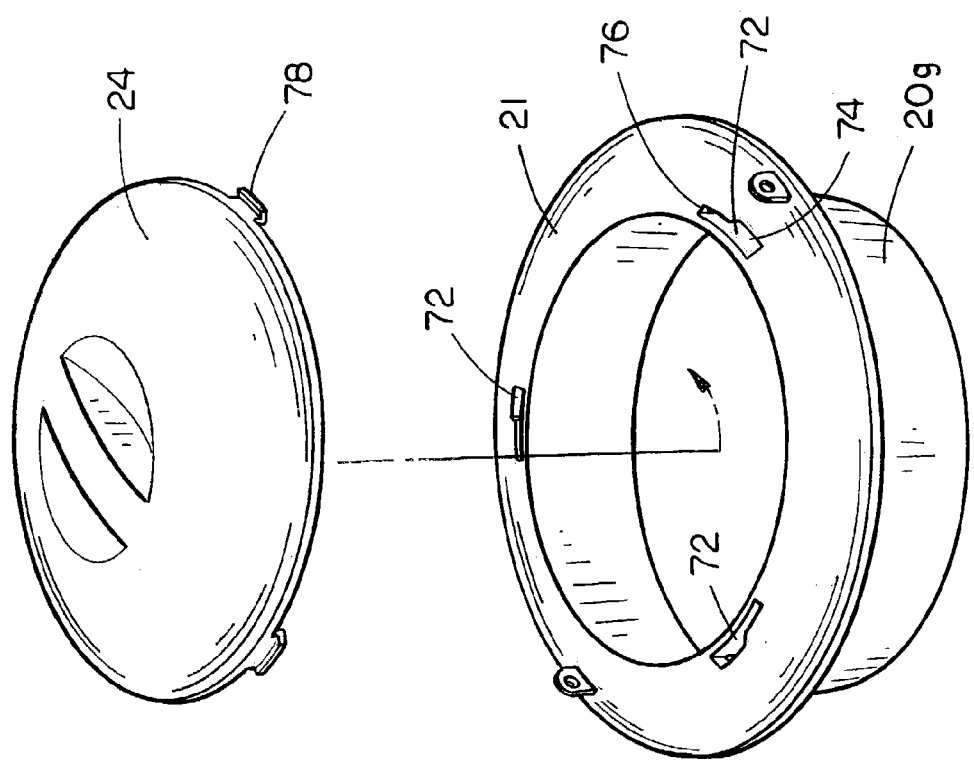
FIG. 6 is an exploded perspective view illustrating the cover of the feeder removed from the feeder.

Additionally, in the embodiment of FIGS. 2 and 5A, when the feeder is in the straight extended position, the outwardly extending shoulders on the upper ends of the segments 20a-20f will engage the inwardly extending shoulders on the lower ends of the segments thereabove. The segments are yieldably maintained in their extended positions by the inwardly extending protrusions which are positioned immediately above the outwardly extended protrusions. In the embodiment of FIG. 5B, the segments are maintained in their extended position by the positioning of the protrusions 126 above the shelf 124 and the frictional engagement of the protrusions 126 with the outer wall surface of the segment adjacent thereto above the shelf 124.

Thus, the structure disclosed herein enables the feeder to be extended from its collapsed position to its extended position and yieldably maintained in the extended position by the structure illustrated in FIGS. 5A and 5B to facilitate filling and hanging of the feeder.

When the feeder is empty and it is desired to collapse the feeder, downward force is applied to the uppermost segment or the lid 24 sufficient to cause the outwardly extending shoulders (i.e., 34) to ride over the protrusion 35 or in the case of the embodiment of FIG. 5B, cause the protrusions 126 to pass over or ride over the shelf 124.

Although it is preferred that the base 16 and rim 18 be circular and that the segments 20 are ring-shaped or annular, the feeder could have a square shape, a rectangular shape or any other shape deemed desirable. It is preferred that the feeder of this invention be comprised of metal, but it could also be comprised of plastic or glass, or any combination thereof.

It can therefore be seen that a novel bird feeder has been provided which may be collapsed for storage or shipment, but which may be extended for use. The bird feeder of this invention is extremely durable due to the construction thereof.

Thus it can be seen that the invention accomplishes at least all of its stated objectives.

I claim:

1. A collapsible feeder for birds and small rodents, comprising:

a collapsible feeder body, selectively movable between collapsed and extended positions, having upper and lower ends, comprising a base and a rim, a series of hollow body segments of graduated diameters which are extendible to form a feeder body, the segment of smallest diameter being joined to said base, the other segments being collapsible around the segment of smallest diameter inwardly of said rim;

the segment of smallest diameter having feed outlets formed therein whereby feed in the feeder body may pass outwardly through said feed outlets onto said base inwardly of said rim;

a hanger pivotally secured to the segment of greatest diameter; and each of said feeder segments including a selective locking structure thereon;

said selective locking structure yieldably maintaining said feeder body in its said extended position;

said body segments being annular-shaped.

\* \* \* \* \*